US012625568B2

(12) United States Patent
Chen et al.

(10) Patent No.: US 12,625,568 B2
(45) Date of Patent: May 12, 2026

(54) MOUSE BUTTON STRUCTURE AND MOUSE DEVICE HAVING THE SAME

(71) Applicant: Voyetra Turtle Beach, Inc., San Diego, CA (US)

(72) Inventors: Shu I. Chen, New Taipei City (TW); Ying Chieh Hung, New Taipei City (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/862,645

(22) PCT Filed: May 12, 2023

(86) PCT No.: PCT/US2023/066921
§ 371 (c)(1),
(2) Date: Nov. 4, 2024

(87) PCT Pub. No.: WO2023/220704
PCT Pub. Date: Nov. 16, 2023

(65) Prior Publication Data
US 2025/0291434 A1     Sep. 18, 2025

(30) Foreign Application Priority Data

May 12, 2022     (TW) ................................. 111117924
Jun. 1, 2022     (CN) ......................... 202210614606.9

(51) Int. Cl.
*G06F 3/0354*     (2013.01)
*G06F 3/02*     (2006.01)
(52) U.S. Cl.
CPC ........ *G06F 3/03543* (2013.01); *G06F 3/0202* (2013.01)

(58) Field of Classification Search
CPC .......................... G06F 3/03543; G06F 3/0202
See application file for complete search history.

(56) References Cited

U.S. PATENT DOCUMENTS

2001/0022578 A1 *  9/2001  Giles ................... G06F 3/03543
                                                            345/163
2012/0013490 A1 *  1/2012  Pance ................... G06F 3/0202
                                                            341/28
(Continued)

FOREIGN PATENT DOCUMENTS

CN          2828923 Y    10/2006
CN       102737886 A    10/2012
(Continued)

*Primary Examiner* — Ariel A Balaoing
(74) *Attorney, Agent, or Firm* — Sheppard Mullin Richter & Hampton LLP

(57)          ABSTRACT

A translational mouse button structure and a mouse having the same are provided. The mouse includes a casing and a mouse button structure arranged in the casing. The mouse button structure may include: a button board, a support member, a cross member and a circuit board provided with a pressing switch. The cross member may be bridged between the button board and the support member by means of translational movement, and respectively provided with a first support group, a second support group and a corresponding support group that are pivotally connected. The button board may be inclined relative to the support member and abuts against the pressing switch, allowing translation along with the cross member. Therefore, any point on the button board can be pressed with the same pressing pressure and the same pressing stroke.

21 Claims, 6 Drawing Sheets

(56)     References Cited

U.S. PATENT DOCUMENTS

| | | | | |
|---|---|---|---|---|
| 2014/0144764 A1* | 5/2014 | Wilson | .................. | H01H 13/83 |
| | | | | 200/344 |
| 2018/0053608 A1 | 2/2018 | Liu | | |
| 2019/0221383 A1* | 7/2019 | Chen | ..................... | G06F 3/0233 |
| 2020/0167011 A1* | 5/2020 | Liu | ....................... | G06F 3/0362 |
| 2020/0273642 A1* | 8/2020 | Yen | ...................... | G06F 1/1664 |
| 2020/0343055 A1* | 10/2020 | Hsu | ................... | H01H 13/7065 |
| 2021/0255711 A1* | 8/2021 | Wang | ................... | G06F 3/0213 |

FOREIGN PATENT DOCUMENTS

| | | | |
|---|---|---|---|
| CN | 203386158 U | 1/2014 |
| CN | 107025004 A | 8/2017 |
| CN | 113299512 A | 8/2021 |
| CN | 214670504 U | 11/2021 |
| CN | 218676878 U | 3/2023 |
| JP | 2000227834 A | 8/2000 |
| KR | 20060070891 A | 6/2006 |
| TW | 201113761 A1 | 4/2011 |
| TW | M515147 U | 1/2016 |
| WO | 2015090780 A1 | 6/2015 |

* cited by examiner

1

MOUSE BUTTON STRUCTURE AND MOUSE DEVICE HAVING THE SAME

CROSS-REFERENCE TO RELATED APPLICATIONS

This application is a National Phase application under 35 U.S.C. § 371 of PCT Application No. PCT/US2023/066921, filed May 12, 2023, which application claims the benefit of Taiwan Patent Application No. 111117924, filed May 12, 2022 (which issued as Taiwan Patent No. 1822040 on Nov. 11, 2023), and Chinese Patent Application No. 202210614606.9, filed Jun. 1, 2022, which are hereby incorporated herein by reference in their entirety.

TECHNICAL FIELD

The present invention relates to a mouse button of a mouse, and in particular to a translational mouse button structure and a mouse device having the translational mouse button structure.

BACKGROUND ART

A mouse typically includes a casing and a switch installed in the casing. The casing is provided with two button boards. These two button boards are commonly known as the left mouse button and the right mouse button. When a user presses the button board, the button board will further press the switch to generate a switch signal.

However, the existing mice have the following shortcomings that need to be improved. One end of the button board is connected to the casing. As a result, when the button board is pressed, the button board can only swing up and down with the joint part as the axis. In addition, there is a certain length from the aforementioned end of the button board to an opposite end thereof. The farther this length is from the aforementioned end, the longer the up and down swing stroke for the button board. This causes the issue that the pressing force required at different points of the button board can be different. Thus, when pressing the button board, a user needs to select a special position to press the button. This leads to a poor pressing feeling, which has been criticized for a long time.

SUMMARY OF THE INVENTION

In order to solve the aforementioned problems in the existing technologies, the present invention proposes a translational mouse button structure and a mouse device having the translational mouse button structure. It allows the button board to have an up and down translational movement when pressed.

The present invention provides a translational mouse button structure, comprising: a circuit board; a pressing switch, which is arranged on the circuit board and comprises a button; a button board, which comprises a pressing part and is provided with two first support groups; a support member, which is arranged on the circuit board and comprises two second support groups; and a cross member, which is movably bridged between the button board and the support member in translation and is provided with a plurality of corresponding support groups, wherein the button board is inclined relative to the support member, the plurality of corresponding support groups are respectively rotatably connected to the two first support groups and the two second support groups, the pressing part correspondingly abuts against the button, and the button board moves in translation along with the cross member.

Optionally, the button board further comprises a board body, a long bracket and a short bracket, the board body is inclined relative to the support member, both the long bracket and the short bracket protrude from one side of the board body toward the support member, and the two first support groups are respectively disposed on protruding ends of the long bracket and the short bracket.

Optionally, the support member is relatively perpendicular to the long bracket and the short bracket, and the board body, the long bracket, the short bracket and the support member together form a right-angled trapezoid.

Optionally, the cross member comprises an inner frame and an outer frame, the inner frame is rotatably connected to the outer frame and the two cross each other, one end of the inner frame and one end of the outer frame together are provided with at least two corresponding support groups, and another end of the inner frame and another end of the outer frame together are provided with the remaining at least two corresponding support groups.

Optionally, the cross member comprises a first through hole, and the pressing switch is arranged in the first through hole.

Optionally, the support member further comprises a base body, the base body comprises a first surface and a second surface opposite to each other, the base body is arranged on the circuit board with the second surface, and the two second support groups are arranged on the first surface of the base body.

Optionally, the base body is provided with a second through hole, and the pressing switch is exposed from the second through hole.

Optionally, the button is a button that can be elastically reset.

Optionally, the two first support groups constitute a first virtual plane, the two second support groups constitute a second virtual plane, the plurality of corresponding support groups constitute a third virtual plane and a fourth virtual plane, and the first virtual plane, the second virtual plane, the third virtual plane and the fourth virtual plane are parallel to each other.

The present invention further provides a mouse device with a translational mouse button structure, comprising: a casing, which is provided with an opening; and at least one translational mouse button structure, which is arranged in the casing with the button board thereof exposed through the opening; the translational mouse button structure comprises:

a circuit board; a pressing switch, which is arranged on the circuit board and comprises a button; a button board, which comprises a pressing part and is provided with two first support groups; a support member, which is arranged on the circuit board and comprises two second support groups; and a cross member, which is movably bridged between the button board and the support member in translation and is provided with a plurality of corresponding support groups, wherein the button board is inclined relative to the support member, the plurality of corresponding support groups are respectively rotatably connected to the two first support groups and the two second support groups, the pressing part correspondingly abuts against the button, and the button board moves in translation along with the cross member.

Optionally, the button board is completely separated from the casing.

Optionally, the mouse device comprises two translational mouse button structures, and the button boards of the two translational mouse button structures are exposed together through the opening.

Compared with the existing technologies, the translational mouse button structure and the mouse device having the translational mouse button structure of the present invention have the following features. By means of making the button board move up and down in translation with the cross member when pressed, the present invention allows any point on the board body of the button board to have the same pressing pressure and the same pressing stroke. Thus, a user can have a desirable pressing feeling without selecting a special pressing position.

Figure 1:
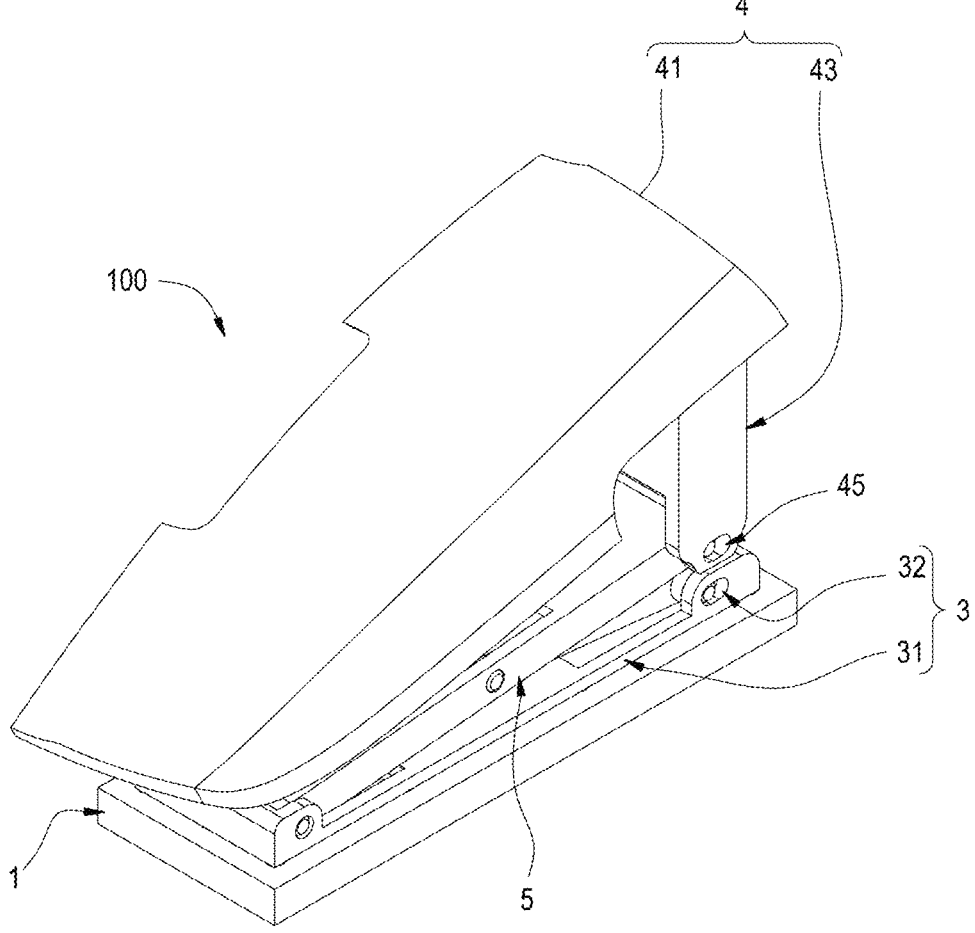
FIG. 1 is a perspective combined view of a mouse button structure of the present invention.

100: mouse button structure; 1: circuit board; 2: pressing switch; 21: button; 3: support member; 31: base body; 31*a*: first surface; 31*b*: second surface; 312: second through hole; 32: second support group; 322: second support part; 4: button board; 41: board body; 42: pressing part; 43: long bracket; 44: short bracket; 45: first support group; 451: first support part; 5: cross member; 51: first through hole; 52: inner frame; 53: outer frame; 54, 55: corresponding support group; 541, 551: corresponding support part; 800: casing; 8: opening.

DESCRIPTION OF THE EMBODIMENTS

The present invention will be further described below in conjunction with the accompanying drawings and specific embodiments, so that a person skilled in the art can better understand the present invention and implement the present invention. However, the exemplary embodiments provided herein are not intended to limit the present invention.

The present invention provides a translational mouse button structure and a mouse device having the translational mouse button structure. The translational mouse button structure of the present invention is shown in FIG. 1 to FIG. 5. In addition, FIG. 6 shows a mouse device having the translational mouse button structure of the present invention.

As shown in FIG. 1 to FIG. 4, the translational mouse button structure (hereinafter referred to as the mouse button structure) 100 of the present invention includes: a circuit board 1, a pressing switch 2, a support member 3, a button board 4, and a cross member 5.

The circuit board 1 has an upper surface and a lower surface (neither of them are labeled with element symbols) opposite to each other. The upper surface faces up, the lower surface faces down. Accordingly, the circuit board 1 is defined with a longitudinal direction (or an up-down direction), which is not shown in the figures, and this longitudinal direction is perpendicular to the circuit board 1.

The pressing switch 2 is a press type switch that has a button 21. The button 21 can control the ON and OFF state. In addition, the button 21 can be elastically reset. For example, the button 21 can be elastically reset in the aforementioned longitudinal direction by using an elastic element which is not shown in the figures. It is in the OFF state after the reset. The pressing switch 2 is arranged on the circuit board 1. In addition, the pressing switch 2 is electrically connected to the circuit board 1.

The button board 4 is a board type body and is disposed above the circuit board 1. The button board 4 includes a pressing part 42 and two first support groups 45. Specifically, the button board 4 has an inner surface (which is not labeled with an element symbol). The pressing part 42 is formed on the inner surface. In this embodiment, the pressing part 42 protrudes from the inner surface toward the circuit board 1 to form a columnar body as shown in the figures. However, this is not limited in the present invention, as long as the button 21 can be correspondingly pressed by the pressing part 42 after the button board 4 is pressed. The two first support groups 45 are used for arranging the cross member 5.

The support member 3 is provided on the circuit board 1 and faces the aforementioned inner surface of the button board 4. The support member 3 includes two second support groups 32. The two second support groups 32 and the aforementioned two first support groups 45 are opposite to each other and face each other. The two second support groups 32 are also used for arranging the cross member 5.

The cross member 5 is bridged between the button board 4 and the support member 3 in a manner of translational movement. The translational movement herein refers to a translational movement of the cross member 5 along the aforementioned longitudinal direction. With regard to the bridged button board 4, it is inclined relative to the support member 3 (or relative to the circuit board 1). The cross member 5 is provided with a plurality of (at least three) corresponding support groups 54, 55. These corresponding support groups 54, 55 are used to connect with the aforementioned two first support groups 45 and two second support groups 32.

It should be noted that each of the aforementioned support groups has a plurality of (at least two) support parts. Among them, the first support group 45 has a plurality of first support parts 451; the second support group 32 has a plurality of second support parts 322, the corresponding support group 54 has a plurality of corresponding support parts 541, and the corresponding support group 55 has a plurality of corresponding support parts 551. Two first support groups 45 jointly form a first virtual plane (not shown in the figures) with the plurality of first support parts 451. The two second support groups 32 jointly form a second virtual plane (not shown in the figures) with the plurality of second support parts 322. The two corresponding support groups 54 jointly form a third virtual plane (not shown in the figures) with the plurality of corresponding support parts 541. The two corresponding support groups 55 jointly form a fourth virtual plane (not shown in the figures) with the plurality of corresponding support parts 551. The first virtual plane, the second virtual plane, the third virtual plane and the fourth virtual plane are parallel to each other.

Figure 3:
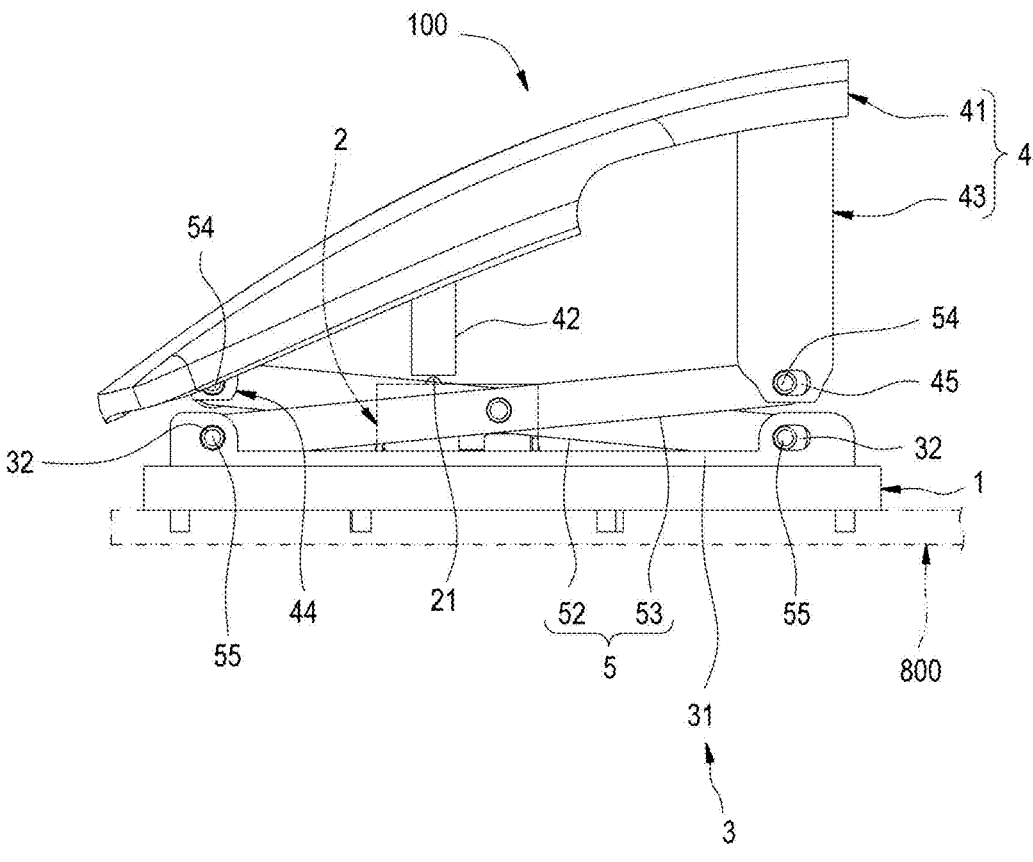
FIG. 3 is a schematic side view of a mouse button structure of the present invention based on FIG. 1.
Figure 5:
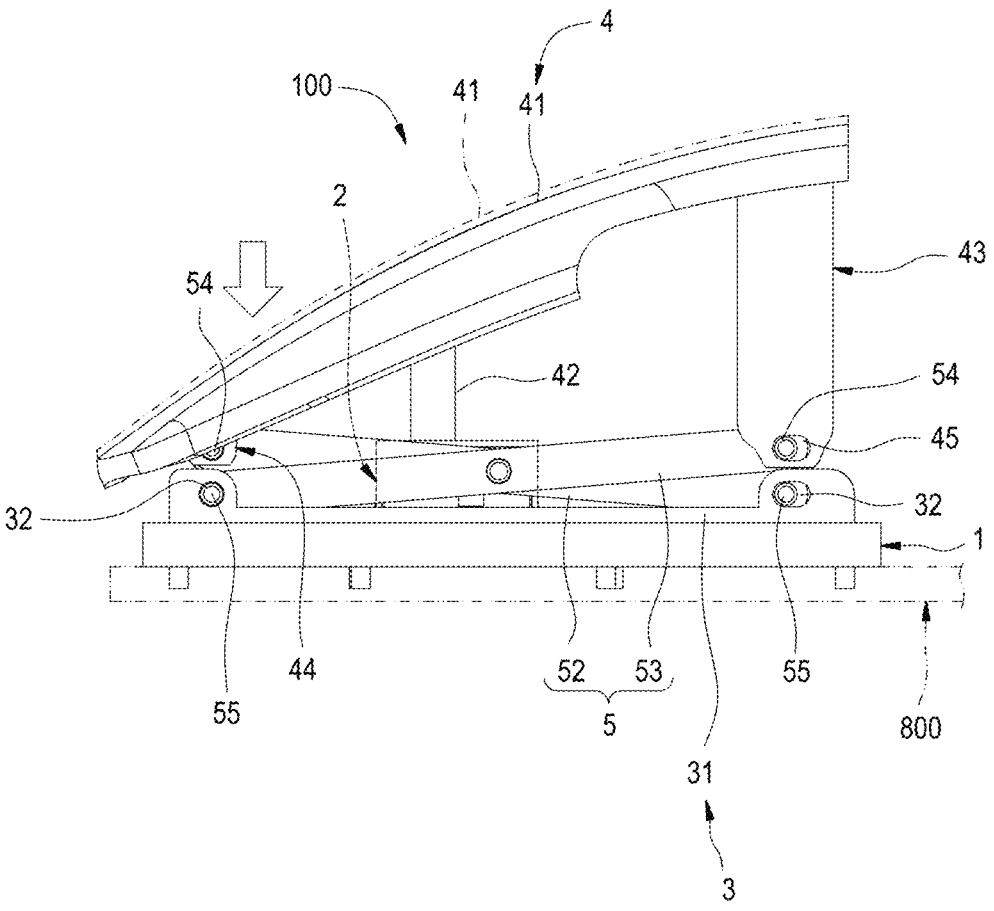
FIG. 5 is a schematic side view of a mouse button structure of the present invention after being pressed.
Figure 6:
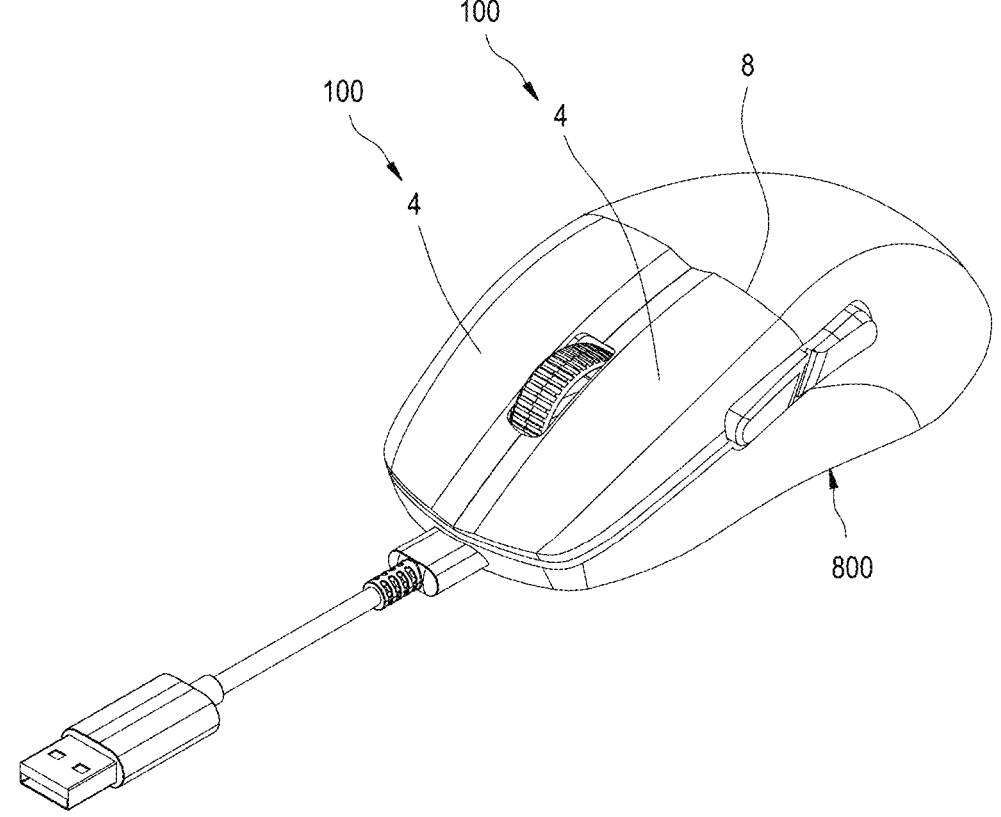
FIG. 6 is a perspective combined view of a mouse device of the present invention.

As shown in FIG. 3 and FIG. 5, each corresponding support part 541 is rotatably connected to a first support part 451; each corresponding support part 551 is rotatably connected to a second support part 322. This allows the button board 4 to move in translation along with the cross member 5 in the aforementioned longitudinal direction. It should be noted that the pressing part 42 of the button board 4 is correspondingly abutted against the button 21 of the pressing switch 2. In this way, whenever the button board 4 is pressed, the pressing part 42 can press the button 21. In addition, the button 21 can be used to further press the button board 4 to move in reverse translation by using the elastic resettable feature of the button 21 as described above.

Figure 2:
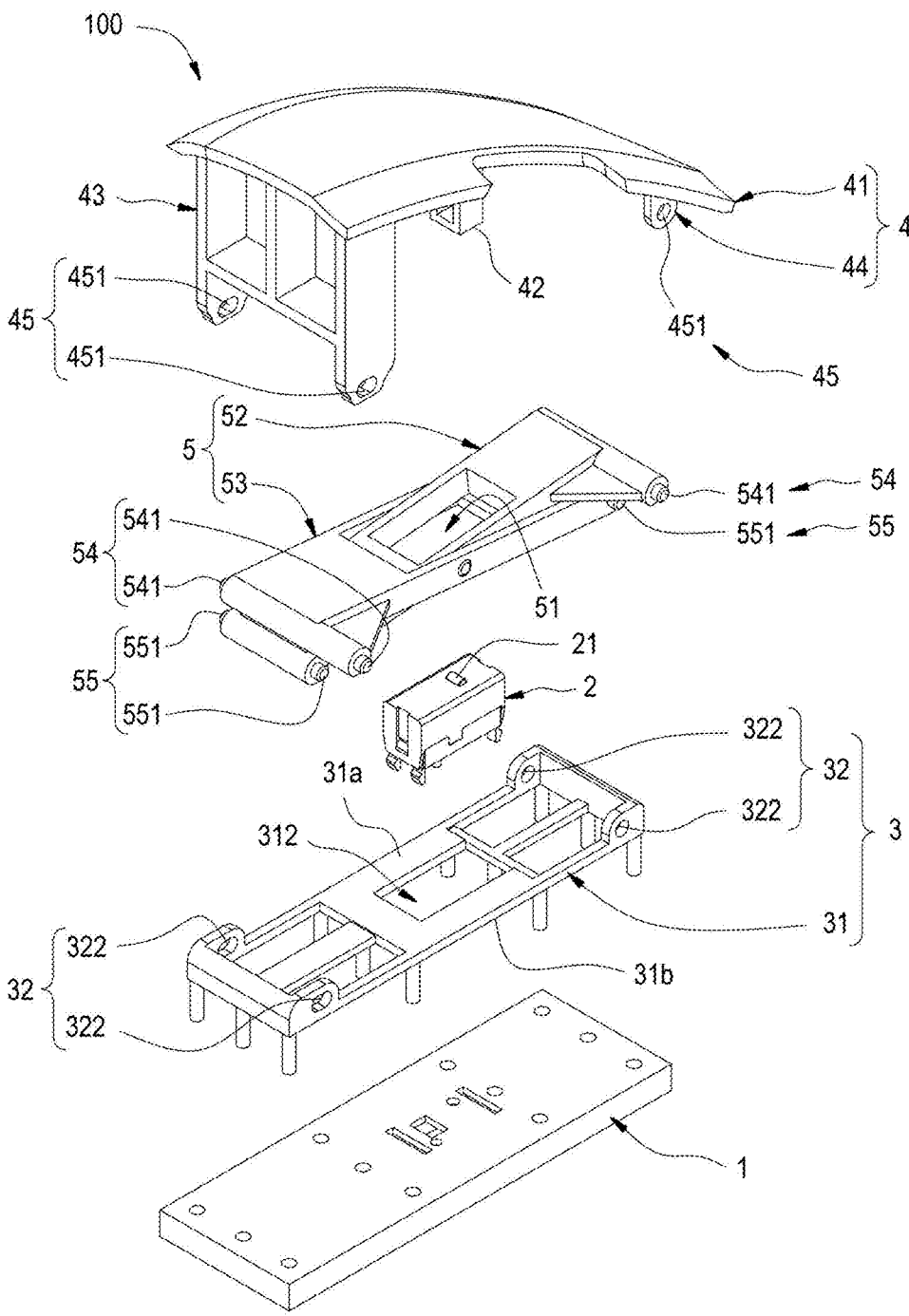
FIG. 2 is a perspective exploded view of a mouse button structure of the present invention.

It should also be noted that, in order to enable the button board 4 to be inclined relative to the support member 3 (or relative to the circuit board 1) under the condition that it can move in translation, the button board 4 may further include a board body 41, a long bracket 43 and a short bracket 44. The board body 41 is inclined at an angle relative to the support member 3 (or relative to the circuit board 1). Both the long bracket 43 and the short bracket 44 protrude from the aforementioned inner surface of the board body 41 toward the support member 3 (or toward the circuit board 1). The plurality of first support parts 451 are respectively disposed on a protruding end of the long bracket 43 and a protruding end of the short bracket 44. As also shown in FIG. 2, the support member 3 includes a base body 31. The base body 31 is provided with the aforementioned second support group 32. Further, as shown in FIG. 3, the long bracket 43 and the short bracket 44 are spaced apart from each other and parallel to each other. The support member 3 is relatively perpendicular to the long bracket 43 (or the short bracket 44). The board body 41, the long bracket 43, the short bracket 44 and the base body 31 together form a right-angled trapezoid.

In this way, the board body 41 of the button board 4 can move in translation in the aforementioned longitudinal direction along with the cross member 5, so that the board body 41 of the button board 4, when pressed, can have a linear translational movement along a longitudinal direction. Accordingly, a user can press any point on the board body 41 with the same pressing force and the same pressing stroke. Thus, a user can have a desirable pressing feeling for pressing the button board 4 without selecting a special pressing position.

In detail, as still shown in FIG. 1 to FIG. 4, the cross member 5 includes an inner frame 52 and an outer frame 53. A middle part of the inner frame 52 is rotatably connected to a middle part of the outer frame 53, and the inner frame and the outer frame cross each other. Two support groups 54 among the plurality of support groups 54 and 55 are respectively arranged at one end of the inner frame 52 and one end of the outer frame 53; the other two support groups 55 among the plurality of support groups 54 and 55 are respectively arranged at another end of the inner frame 52 and another end of the outer frame 53.

Figure 4:
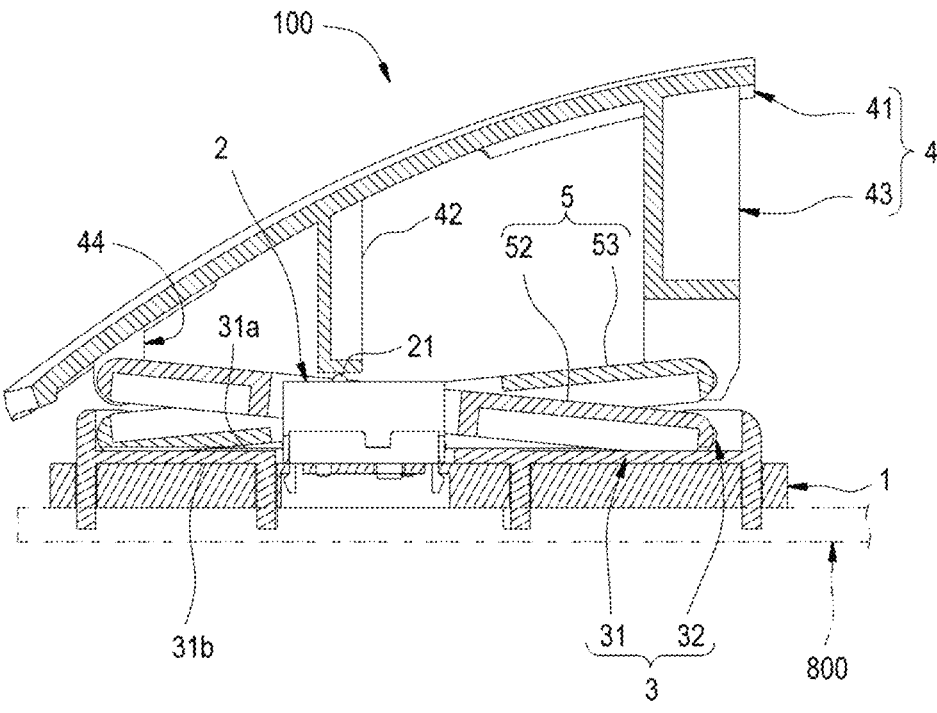
FIG. 4 is a schematic sectional view of a mouse button structure of the present invention based on FIG. 4.

In addition, as shown in FIG. 2 and FIG. 4, the base body 31 of the support member 3 has a first surface 31a and a second surface 31b opposite to each other. The base body 31 is disposed on the circuit board 1 with its second surface 31b. Moreover, the second support groups 32 are disposed on the first surface 31a.

Furthermore, to ensure that the button 21 of the pressing switch 2 can be abutted against and pressed by the pressing part 42, as shown in FIG. 2 and FIG. 4, the cross member 5 has a first through hole 51, and the base body 31 is provided with a second through hole 312. The pressing switch 2 can be exposed through the second through hole 312 and located within the first through hole 51. In addition, the button 21 can be directly abutted against by the pressing part 42.

It should be noted that, by bridging the cross member 5 between the button board 4 and the support member 3, the cross member 5 can properly hold the button board 4. In this way, even if there is an improper gap (not shown in the figures) between the pressing part 42 and the button 21 due to a tolerance issue, the mouse button structure 100 of the present invention can still use the cross member 5 to hold the button board 4, such that the button board 4 together with the pressing part 42 thereof can be pulled in a direction toward the pressing switch 2 so as to eliminate the improper gap. This can even eliminate the noise of the button board 4 caused by shaking or vibration.

As shown in FIG. 6 in conjunction with FIG. 1 and FIG. 2, the present invention further provided a mouse device (hereinafter referred to as the mouse device) having the translational mouse button structure of the present invention. The mouse device includes: a casing 800 and at least one translational mouse button structure (that is, the mouse button structure for short) 100. The present invention does not limit how many mouse button structures the mouse device 100 should be provided. In this embodiment, two mouse button structures are taken as an example for description.

The casing 800 is provided with an opening 8. The two mouse button structures 100 are both disposed in the casing 800. The board bodies 41 of the two button boards 4 are enclosed exclusively with respect to the opening 8. In other words, the two board bodies 41 are both exposed through the opening 8.

It is noted that the board body 41 of each mouse button structure 100 is completely separated from the casing 800. That is to say, the board bodies 41 are no longer connected to the casing as is the case in the existing technologies, rather, they can only swing up and down with the connection thereof as the axis. The board body 41 of the present invention can indeed move in translation in the longitudinal direction along with the cross member 5.

In summary, the present invention provides the translational mouse button structure and the mouse device having the translational mouse button structure. The present invention can achieve the intended purpose of use and solve the problems in the existing technologies. In addition, the above-mentioned embodiments are only some preferred embodiments for illustrating the present invention. The scope of protection of the present invention is not limited to these preferred embodiments. Equivalent substitutions or transformations made by a person skilled in the art on the basis of the present invention are all within the scope of protection of the present invention. The scope of protection of the present invention is defined by the claims.

What is claimed is:

1. A translational mouse button structure comprising:
   a circuit board;
   a pressing switch, which is arranged on the circuit board and comprises a button;
   a button board, which comprises a pressing part and is provided with two first support groups;
   a support member, which is arranged on the circuit board and comprises two second support groups; and
   a cross member, which is movably bridged between the button board and the support member in translation and is provided with a plurality of corresponding support groups, wherein the button board is inclined relative to the support member, the plurality of corresponding support groups are respectively rotatably connected to the two first support groups and the two second support groups, the pressing part correspondingly abuts against the button, and the button board moves in translation along with the cross member.

2. The translational mouse button structure according to claim 1, further comprising a board body, a long bracket and a short bracket, the board body is inclined relative to the support member, both the long bracket and the short bracket protrude from one side of the board body toward the support member, and the two first support groups are respectively disposed on protruding ends of the long bracket and the short bracket.

3. The translational mouse button structure according to claim 2, wherein the support member is relatively perpendicular to the long bracket and the short bracket, and the board body, the long bracket, the short bracket and the support member together form a right-angled trapezoid.

4. The translational mouse button structure according to claim 1, wherein the cross member comprises an inner frame and an outer frame, the inner frame is rotatably connected to the outer frame and the inner frame and an outer frame cross each other, one end of the inner frame and one end of the outer frame together are provided with at least two corresponding support groups, and another end of the inner frame and another end of the outer frame together are provided with the remaining at least two corresponding support groups.

5. The translational mouse button structure according to claim 1, wherein the cross member comprises a first through hole, and the pressing switch is arranged in the first through hole.

6. The translational mouse button structure according to claim 1, wherein the support member further comprises a base body, the base body comprises a first surface and a second surface opposite to each other, the base body is arranged on the circuit board with the second surface, and the two second support groups are arranged on the first surface of the base body.

7. The translational mouse button structure according to claim 6, wherein the base body is provided with a second through hole, and the pressing switch is exposed from the second through hole.

8. The translational mouse button structure according to claim 1, wherein the button is a button that can be elastically reset.

9. The translational mouse button structure according to claim 1, wherein the two first support groups constitute a first virtual plane, the two second support groups constitute a second virtual plane, the plurality of corresponding support groups constitute a third virtual plane and a fourth virtual plane, and the first virtual plane, the second virtual plane, the third virtual plane and the fourth virtual plane are parallel to each other.

10. A mouse device comprising;
a casing; and
a translational mouse button structure disposed at least partially within the casing, the translational mouse button structure comprising:
a circuit board;
a pressing switch, which is arranged on the circuit board and comprises a button;
a button board, which comprises a pressing part and is provided with two first support groups;
a support member, which is arranged on the circuit board and comprises two second support groups; and
a cross member, which is movably bridged between the button board and the support member in translation and is provided with a plurality of corresponding support groups, wherein the button board is inclined relative to the support member, the plurality of corresponding support groups are respectively rotatably connected to the two first support groups and the two second support groups, the pressing part correspondingly abuts against the button, and the button board moves in translation along with the cross member.

11. The mouse device according to claim 10, wherein the button board is completely separated from the casing.

12. The mouse device according to claim 10, wherein the mouse device comprises at least two translational mouse button structures, wherein each of the two translational mouse button structures comprises a button board, and wherein the button boards of the two translational mouse button structures are exposed together through an opening.

13. The mouse device according to claim 10, wherein the translational mouse button structure further comprises a board body, a long bracket and a short bracket, the board body is inclined relative to the support member, both the long bracket and the short bracket protrude from one side of the board body toward the support member, and the two first support groups are respectively disposed on protruding ends of the long bracket and the short bracket.

14. The mouse device according to claim 13, wherein the support member is relatively perpendicular to the long bracket and the short bracket, and the board body, the long bracket, the short bracket and the support member together form a right-angled trapezoid.

15. The mouse device according to claim 10, wherein the cross member comprises an inner frame and an outer frame, the inner frame is rotatably connected to the outer frame and the inner frame and outer frame cross each other, one end of the inner frame and one end of the outer frame together are provided with at least two corresponding support groups, and another end of the inner frame and another end of the outer frame together are provided with the remaining at least two corresponding support groups.

16. The mouse device according to claim 10, wherein the cross member comprises a first through hole, and the pressing switch is arranged in the first through hole.

17. The mouse device according to claim 10, wherein the support member further comprises a base body, the base body comprises a first surface and a second surface opposite to each other, the base body is arranged on the circuit board with the second surface, and the two second support groups are arranged on the first surface of the base body.

18. The mouse device according to claim 17, wherein the base body is provided with a second through hole, and the pressing switch is exposed from the second through hole.

19. The mouse device according to claim 10, wherein the button comprises a button that can be elastically reset.

20. The mouse device according to claim 10, wherein the two first support groups constitute a first virtual plane, the two second support groups constitute a second virtual plane, the plurality of corresponding support groups constitute a third virtual plane and a fourth virtual plane, and the first virtual plane, the second virtual plane, the third virtual plane and the fourth virtual plane are parallel to each other.

21. The translational mouse button structure according to claim 1, further comprising a casing provided with an opening, wherein the casing houses at least part of the translational mouse button structure.

* * * * *